(12) United States Patent
Mikhaylik et al.

(10) Patent No.: US 9,034,421 B2
(45) Date of Patent: May 19, 2015

(54) METHOD OF FORMING ELECTRODES COMPRISING SULFUR AND POROUS MATERIAL COMPRISING CARBON

(75) Inventors: Yuriy V. Mikhaylik, Tucson, AZ (US); William F. Wilkening, Tucson, AZ (US); Christopher T. S. Campbell, Tucson, AZ (US); Savannah V. Burnside, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 757 days.

(21) Appl. No.: 12/811,576

(22) PCT Filed: Jan. 8, 2009

(86) PCT No.: PCT/US2009/000090
§ 371 (c)(1),
(2), (4) Date: Sep. 23, 2010

(87) PCT Pub. No.: WO2009/089018
PCT Pub. Date: Jul. 16, 2009

(65) Prior Publication Data
US 2011/0008531 A1    Jan. 13, 2011

Related U.S. Application Data

(60) Provisional application No. 61/010,330, filed on Jan. 8, 2008.

(51) Int. Cl.
*H01M 4/58* (2010.01)
*H01M 4/62* (2006.01)
(Continued)

(52) U.S. Cl.
CPC .............. *H01M 4/139* (2013.01); *H01M 4/04* (2013.01); *H01M 4/38* (2013.01); *H01M 4/62* (2013.01);
(Continued)

(58) Field of Classification Search
CPC ....... H01M 4/62; H01M 4/621; H01M 4/624; H01M 4/626
See application file for complete search history.

(56) References Cited

U.S. PATENT DOCUMENTS 3,716,409 A    2/1973   Cairns et al.
3,833,421 A    9/1974   Rubischko et al.
(Continued)

FOREIGN PATENT DOCUMENTS

CN    1534811 A    10/2004
CN    1574427       2/2005
(Continued)

OTHER PUBLICATIONS

Peer, http://peer.tamu.edu/curriculum_modules/properties/module_3/Tef_methyl_ethyl.htm, Retrieved online on May 31, 2013, p. 1.*

(Continued)

*Primary Examiner* — Michael Cleveland
*Assistant Examiner* — Francisco Tschen
(74) *Attorney, Agent, or Firm* — Wolf, Greenfield & Sacks, P.C.

(57) ABSTRACT

The present invention relates to electrochemical cells, electrodes, and related methods. In some embodiments, a removable filler material may be employed during fabrication of an electrochemical cell, or component thereof, to produce electrochemical devices having improved cell performance and rate capability. Electrochemical cells may exhibit enhanced utilization of electroactive species and/or increased accessibility of electroactive species within the electrochemical cell during operation. In some cases, the invention may provide electrodes which advantageously possess both high loading of an electroactive species (e.g., greater than 1.5 mg/cm2), while also maintaining the stability and good mechanical properties of the electrode.

41 Claims, 3 Drawing Sheets

(51) Int. Cl.
  *H01M 4/139* (2010.01)
  *H01M 4/04* (2006.01)
  *H01M 4/38* (2006.01)
  *H01M 4/66* (2006.01)
  *H01M 4/80* (2006.01)
  *H01M 10/052* (2010.01)

(52) U.S. Cl.
  CPC .............. *H01M 4/621* (2013.01); *H01M 4/663* (2013.01); *H01M 4/80* (2013.01); *H01M 10/052* (2013.01); *Y02E 60/122* (2013.01)

(56) References Cited

U.S. PATENT DOCUMENTS

| | | | |
|---|---|---|---|
| 3,859,139 A * | 1/1975 | Dews et al. | 429/535 |
| 3,907,579 A | 9/1975 | Ravault | |
| 3,951,689 A | 4/1976 | Ludwig | |
| 4,011,374 A | 3/1977 | Kaun | |
| 4,169,120 A | 9/1979 | Miller | |
| 4,184,013 A | 1/1980 | Weddigen et al. | |
| 4,235,528 A | 11/1980 | Yano et al. | |
| 4,337,140 A * | 6/1982 | Solomon | 204/292 |
| 4,339,325 A * | 7/1982 | Solomon et al. | 204/296 |
| 4,410,609 A | 10/1983 | Peled et al. | |
| 4,556,618 A * | 12/1985 | Shia | 429/217 |
| 4,624,902 A | 11/1986 | DeNeufville et al. | |
| 4,664,991 A | 5/1987 | Perichaud et al. | |
| 4,677,415 A | 6/1987 | Howng | |
| 4,683,178 A | 7/1987 | Stadnick et al. | |
| 4,720,400 A | 1/1988 | Manniso | |
| 4,739,018 A | 4/1988 | Armand et al. | |
| 4,770,956 A | 9/1988 | Knoedler | |
| 4,833,048 A | 5/1989 | Dejonghe et al. | |
| 4,917,974 A | 4/1990 | De Jonghe et al. | |
| H858 H | 12/1990 | Leonard et al. | |
| 5,126,082 A | 6/1992 | Frank | |
| 5,162,175 A | 11/1992 | Visco et al. | |
| 5,194,341 A | 3/1993 | Bagley et al. | |
| 5,324,599 A | 6/1994 | Oyama et al. | |
| 5,328,946 A * | 7/1994 | Tuminello et al. | 524/462 |
| 5,433,917 A | 7/1995 | Srivastava et al. | |
| 5,441,831 A | 8/1995 | Okamoto et al. | |
| 5,516,598 A | 5/1996 | Visco et al. | |
| 5,529,860 A | 6/1996 | Skotheim et al. | |
| 5,538,812 A | 7/1996 | Lee et al. | |
| 5,582,623 A | 12/1996 | Chu | |
| 5,601,947 A | 2/1997 | Skotheim et al. | |
| 5,648,187 A | 7/1997 | Skotheim | |
| 5,686,201 A | 11/1997 | Chu | |
| 5,690,702 A | 11/1997 | Skotheim et al. | |
| 5,698,339 A | 12/1997 | Kawakami et al. | |
| 5,723,230 A | 3/1998 | Naoi et al. | |
| 5,783,330 A | 7/1998 | Naoi et al. | |
| 5,792,575 A | 8/1998 | Naoi et al. | |
| 5,814,420 A | 9/1998 | Chu | |
| 5,861,222 A | 1/1999 | Fischer et al. | |
| 5,882,819 A | 3/1999 | Naoi et al. | |
| 5,895,732 A | 4/1999 | Clough | |
| 5,919,587 A | 7/1999 | Mukherjee et al. | |
| 5,961,672 A | 10/1999 | Skotheim et al. | |
| 5,989,467 A | 11/1999 | Daws et al. | |
| 6,030,720 A | 2/2000 | Chu et al. | |
| 6,110,417 A | 8/2000 | Sugikawa | |
| 6,110,621 A | 8/2000 | Sandi et al. | |
| 6,117,590 A | 9/2000 | Skotheim et al. | |
| 6,143,216 A | 11/2000 | Loch et al. | |
| 6,153,337 A | 11/2000 | Carlson et al. | |
| 6,168,694 B1 | 1/2001 | Huang et al. | |
| 6,168,886 B1 | 1/2001 | Clough | |
| 6,194,099 B1 | 2/2001 | Gernov et al. | |
| 6,201,100 B1 | 3/2001 | Gorkovenko et al. | |
| 6,306,545 B1 | 10/2001 | Carlson et al. | |
| 6,312,853 B1 | 11/2001 | Zhang et al. | |
| 6,358,643 B1 | 3/2002 | Katz et al. | |
| 6,403,261 B2 | 6/2002 | Mitkin et al. | |
| 6,528,211 B1 | 3/2003 | Nishimura et al. | |
| 6,558,847 B1 | 5/2003 | Kawakami et al. | |
| 6,680,013 B1 | 1/2004 | Stein et al. | |
| 6,753,036 B2 | 6/2004 | Jankowski et al. | |
| 6,913,998 B2 | 7/2005 | Jankowski et al. | |
| 7,019,494 B2 | 3/2006 | Mikhaylik | |
| 7,029,796 B2 | 4/2006 | Choi et al. | |
| 7,157,185 B2 | 1/2007 | Marple | |
| 7,247,408 B2 | 7/2007 | Skotheim et al. | |
| 7,250,233 B2 | 7/2007 | Choi et al. | |
| 7,361,431 B2 * | 4/2008 | Kim et al. | 429/213 |
| 7,553,584 B2 | 6/2009 | Chiang et al. | |
| 7,579,112 B2 | 8/2009 | Chiang et al. | |
| 7,771,870 B2 | 8/2010 | Affinito et al. | |
| 8,087,309 B2 | 1/2012 | Kelley et al. | |
| 8,137,525 B1 | 3/2012 | Harreld et al. | |
| 2001/0024749 A1 * | 9/2001 | Michot et al. | 429/122 |
| 2001/0034934 A1 * | 11/2001 | Xu et al. | 29/623.1 |
| 2001/0041283 A1 | 11/2001 | Hitomi | 429/42 |
| 2002/0009626 A1 * | 1/2002 | Terazono et al. | 429/30 |
| 2002/0018933 A1 | 2/2002 | Mitkin et al. | |
| 2002/0106561 A1 * | 8/2002 | Lee et al. | 429/218.1 |
| 2002/0192557 A1 | 12/2002 | Choi et al. | |
| 2003/0073000 A1 | 4/2003 | Lee et al. | |
| 2003/0082446 A1 * | 5/2003 | Chiang et al. | 429/209 |
| 2003/0099884 A1 | 5/2003 | Chiang et al. | |
| 2003/0108785 A1 | 6/2003 | Wu et al. | |
| 2003/0113622 A1 * | 6/2003 | Blasi et al. | 429/199 |
| 2003/0113624 A1 | 6/2003 | Kim et al. | |
| 2003/0124427 A1 | 7/2003 | Takeuchi et al. | |
| 2003/0180611 A1 * | 9/2003 | Mikhaylik et al. | 429/218.1 |
| 2003/0215714 A1 | 11/2003 | Barker et al. | |
| 2003/0222048 A1 | 12/2003 | Asakawa et al. | |
| 2004/0037771 A1 | 2/2004 | Meissner et al. | |
| 2004/0047798 A1 | 3/2004 | Oh et al. | |
| 2004/0058246 A1 | 3/2004 | Choi et al. | |
| 2004/0118698 A1 | 6/2004 | Lu et al. | |
| 2004/0191607 A1 | 9/2004 | Nobuta et al. | |
| 2004/0202936 A1 | 10/2004 | Mikhaylik | |
| 2004/0234851 A1 | 11/2004 | Kim et al. | |
| 2004/0265672 A1 * | 12/2004 | Wei | 429/34 |
| 2005/0048371 A1 | 3/2005 | Nagayama et al. | |
| 2005/0156575 A1 | 7/2005 | Mikhaylik | |
| 2005/0158535 A1 | 7/2005 | Zhang et al. | |
| 2005/0175904 A1 | 8/2005 | Gorkovenko | |
| 2005/0181269 A1 * | 8/2005 | Eshraghi et al. | 429/44 |
| 2005/0234177 A1 * | 10/2005 | Zaghib et al. | 524/435 |
| 2005/0266990 A1 * | 12/2005 | Iwasaki et al. | 502/416 |
| 2006/0024579 A1 * | 2/2006 | Kolosnitsyn et al. | 429/209 |
| 2006/0046926 A1 * | 3/2006 | Ji et al. | 502/101 |
| 2006/0115579 A1 | 6/2006 | Mukherjee et al. | |
| 2006/0193889 A1 | 8/2006 | Spradlin et al. | |
| 2006/0194096 A1 | 8/2006 | Valle et al. | |
| 2006/0238203 A1 | 10/2006 | Kelley et al. | |
| 2007/0065701 A1 | 3/2007 | Cable et al. | |
| 2007/0065724 A1 | 3/2007 | Barker et al. | |
| 2007/0207370 A1 | 9/2007 | Kwak et al. | |
| 2007/0221265 A1 | 9/2007 | Affinito et al. | |
| 2007/0224502 A1 | 9/2007 | Affinito et al. | |
| 2008/0100264 A1 | 5/2008 | Kolosnitsyn et al. | |
| 2008/0187663 A1 | 8/2008 | Affinito | |
| 2008/0246580 A1 | 10/2008 | Braun et al. | |
| 2008/0318128 A1 | 12/2008 | Simoneau et al. | |
| 2009/0053607 A1 | 2/2009 | Jeong et al. | |
| 2009/0098457 A1 | 4/2009 | Kwon et al. | |
| 2009/0159853 A1 | 6/2009 | Sengupta et al. | |
| 2009/0200986 A1 | 8/2009 | Kopera et al. | |
| 2009/0311604 A1 * | 12/2009 | Nazar et al. | 429/231.8 |
| 2010/0035128 A1 | 2/2010 | Scordilis-Kelley et al. | |
| 2010/0068623 A1 | 3/2010 | Braun et al. | |
| 2010/0129699 A1 | 5/2010 | Mikhaylik et al. | |
| 2010/0239914 A1 | 9/2010 | Mikhaylik et al. | |
| 2011/0045346 A1 | 2/2011 | Chiang et al. | |
| 2011/0059361 A1 | 3/2011 | Wilkening et al. | |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |

(56) References Cited

U.S. PATENT DOCUMENTS

| | | | |
|---|---|---|---|
| 2011/0129723 | A1 | 6/2011 | Tsuchida |
| 2011/0165466 | A1 | 7/2011 | Zhamu et al. |
| 2011/0177398 | A1 | 7/2011 | Affinito et al. |
| 2011/0206992 | A1 | 8/2011 | Campbell et al. |
| 2011/0256450 | A1 | 10/2011 | Campbell et al. |
| 2012/0028128 | A1 | 2/2012 | Seino et al. |
| 2012/0048729 | A1 | 3/2012 | Mikhaylik et al. |
| 2012/0070746 | A1 | 3/2012 | Mikhaylik et al. |
| 2013/0224601 | A1 | 8/2013 | Burnside et al. |
| 2013/0252103 | A1 | 9/2013 | Mikhaylik et al. |
| 2013/0316072 | A1 | 11/2013 | Scordilis-Kelley et al. |

FOREIGN PATENT DOCUMENTS

| | | | |
|---|---|---|---|
| CN | 1845364 | A | 10/2006 |
| CN | 1323445 | C | 6/2007 |
| CN | 101026247 | | 8/2007 |
| CN | 100355123 | C | 12/2007 |
| EP | 1 324 409 | A2 | 7/2003 |
| GB | 1011353 | A | 11/1965 |
| GB | 1 396 062 | A | 5/1975 |
| JP | 05-325978 | A | 12/1993 |
| JP | 09-147868 | A | 6/1997 |
| JP | 11-176423 | * | 2/1999 |
| JP | 2001-093577 | A | 4/2001 |
| JP | 2001-527275 | A | 12/2001 |
| JP | 2002-203542 | A | 7/2002 |
| JP | 2002-367678 | A | 12/2002 |
| JP | 2003-514356 | A | 4/2003 |
| JP | 2003-193110 | A | 7/2003 |
| JP | 2003-197196 | A | 7/2003 |
| JP | 2003-303588 | A | 10/2003 |
| JP | 2004-119367 | A | 4/2004 |
| JP | 2005-251429 | A | 9/2005 |
| JP | 2005-310836 | A | 11/2005 |
| JP | 2006-092881 | A | 4/2006 |
| JP | 2006-092885 | A | 4/2006 |
| JP | 2006-093066 | A | 4/2006 |
| JP | 2006-143478 | A | 6/2006 |
| JP | 2007-091511 | A | 4/2007 |
| JP | 2007-234338 | A | 9/2007 |
| JP | 2009-076260 | A | 4/2009 |
| JP | 2010-009856 | A | 1/2010 |
| JP | 2011-518743 | A | 6/2011 |
| KR | 10-0436712 | B1 | 6/2004 |
| KR | 10-0484642 | B1 | 4/2005 |
| WO | WO 99/33125 | A1 | 7/1999 |
| WO | WO 99/33130 | A1 | 7/1999 |
| WO | WO 2007/028972 | A1 | 3/2007 |
| WO | WO 2008/153749 | A1 | 12/2008 |
| WO | WO 2009/017726 | A1 | 2/2009 |
| WO | WO 2009/042071 | A2 | 4/2009 |
| WO | WO 2009/054987 | A1 | 4/2009 |
| WO | WO 2009/089018 | A2 | 7/2009 |
| WO | WO 2009/114314 | A2 | 9/2009 |
| WO | WO 2010/062391 | A2 | 6/2010 |
| WO | WO 2010/074690 | A1 | 7/2010 |
| WO | WO 2012/027457 | A2 | 3/2012 |

OTHER PUBLICATIONS

Written Opinion for PCT/US2009/000090 mailed Jan. 12, 2010.
International Search Report and Written Opinion for PCT/US2010/000819, mailed Dec. 21, 2010.
International Preliminary Report on Patentability for PCT/US2010/000819, mailed Sep. 29, 2011.
International Search Report and Written Opinion for PCT/US2010/002329, mailed May 31, 2011.
International Preliminary Report on Patentability for PCT/US2010/002329, mailed Feb. 28, 2012.
Campbell et al., Electrodeposition of Mesoporous Nickel onto Foamed Metals Using Surfactant and Polymer Templates. J Porous Mater. 2004;11(2):63-69.
Cheon et al., Capacity fading mechanisms on cycling a high-capacity secondary sulfur cathode. J Electrochem Soc. Oct. 29, 2004;151(12):A2067-73.
Cheon et al., Rechargeable lithium sulfur battery: II. Rate capability and cycle characteristics. J Electrochem Soc. May 5, 2003;150(6):A800-05.
Cunningham et al., Phase Equilibria in Lithium-Chalcogen Systems. J Electrochem Soc. 1972;119:1448-50.
Doherty et al., Colloidal Crystal Templating to Produce Hierarchically Porous LiFePO4 Electrode Materials for High Power Lithium Ion Batteries. Chem Mater. 2009;21(13):2895-2903.
Garboczi, Permeability, diffusivity, and microstructural parameters: A critical review. Cement and Concrete Res. Jul. 1990;20(4):591-601.
Gonzenbach et al., Macroporous ceramics from particle-stabilized wet foams. J Am Ceram Soc. 2007;90(1):16-22.
Ji et al., A highly ordered nanostructured carbon-sulphur cathode for lithium-sulphur batteries. Nature Mater. May 17, 2009;8(6):500-06.
Kim et al., Correlation between positive-electrode morphology and sulfur utilization in lithium-sulfur battery. J Power Sources. May 20, 2004;132(1-2):209-12.
Kulinowski et al., Porous metals from colloidal templates. Adv Mater. 2000;12(11): 833-38.
Mikhaylik et al., Polysulfide Shuttle Study in the Li/S Battery System. J Electrochem Soc. 2004;151:A1969-76.
Mikhaylik et al., 380 Wh/kg Rechargeable Li/S Batteries Operating at 90% of Sulfur Utilization. $206^{th}$ Meeting of the Electrochemical Society. Honolulu, Hawaii. Oct. 3-8, 2004. Abst. 443.
Probst et al., Structure and electrical properties of carbon black. Carbon. Feb. 2002;40(2):201-5.
Rauh et al., A Lithium/Dissolved Sulfur Battery with an Organic Electrolyte. J Electrochem Soc. 1979;126:523-27.
Ravikrishna et al., Low-temperature synthesis of porous hydroxyapatite scaffolds using polyaphron templates. J Sol-Gel Sci Techn. Apr. 2006;38(2):203-10.
Ruiz-Morales et al., Microstructural optimisation of materials for SOFC applications using PMMA microspheres. J Mater Chem. 2006;16:540-42.
Ryu et al., Discharge behavior of lithium/sulfur cell with TEGDME based electrolyte at low temperature. J Electrochem Soc. 2006;163:201-06.
Sakka et al., Fabrication of porous ceramics with controlled pore size by colloidal processing. Sci Technol Adv Mater. Nov. 2005;6(8):915-20.
Shim et al., The Lithium/Sulfur Rechargeable Cell. Effects of Electrode Composition and Solvent on Cell Performance. J Electrochem Soc. 2002;149:A1321-25.
Shin et al., Characterization of N-Methyl-N-Butylprrolidinium Bis(trifluoromethanesulfonyl)imide-LiTFSI-Tetra(ethylene gylcol) Dimethyl Ether Mixtures as a Li Metal Cell Electrolyte. J Power Sources. 2008;155:A368-73.
Wang et al., Electrochemical characteristics of sulfur composite cathode materials in rechargeable lithium batteries. J Power Sources. Nov. 15, 2004;138(1-2):271-73.
Wang et al., Sulfur—carbon nano-composite as cathode for rechargeable lithium battery based on gel electrolyte. Electrochem Comm. 2002;4(6):499-502.
Woo et al., Preparation and characterization of three demensionally ordered macroporous $Li_4Ti_5O_{12}$ anode for lithium batteries. Electrochimica Acta. 2007;53(1):79-82.
Yuan et al., Improvement of cycle property of sulfur-coated multi-walled carbon nanotubes composite cathode for lithium/sulfur batteries. J Power Sources. Apr. 15, 2009;189(2):1141-46.
Zhang et al., Dual-scale porous electrodes for solid oxide fuel cells from polymer foams. Adv Mater. 2005;17(4):487-91.
Zhang et al., Novel Nanosized Adsorbing Composite Cathode Materials for the Next Generational Lithium Battery. Journal of Wuhan University of Technology—Mater. Sci. Ed. 2007;22(2):234-39.
Zhang et al., Three-dimensional ordered macroporous platinum-based electrode for methanol oxidation. Chinese Sci Bulletin. Jan. 2006;51(1):19-24.

(56) References Cited

OTHER PUBLICATIONS

Zheng et al., Electrochemical properties of rechargeable lithium batteries with sulfur-containing composite cathode materials. Electrochem Solid-State Lett., May 12, 2006; 9(7):A364-A367.

Zheng et al., Novel nanosized adsorbing sulfur composite cathode materials for the advanced secondary lithium batteries. Electrochimica Acta. Jan. 5, 2006;51(7):1330-35.

International Preliminary Report on Patentability for PCT/US2009/000090, date of completion Apr. 15, 2010.

International Search Report for PCT/US2009/000090, date of mailing M Jul. 31, 2009.

Written Opinion for PCT/US2009/000090, date of mailing Jul. 31, 2009.

Office Communication mailed Aug. 31, 2012 in connection with CN 200980104676.2 and English translation thereof.

Office Communication mailed Apr. 16, 2013 in connection with CN 200980104676.2 and English translation thereof.

Extended European Search Report for EP09700611.8, mailed Apr. 4, 2013.

International Search Report and Written Opinion for PCT/US2009/000090 mailed Jul. 31, 2009.

International Preliminary Report on Patentability for PCT/US2009/000090, mailed Apr. 30, 2010.

International Search Report and Written Opinion for PCT/US2012/026281, mailed Sep. 26, 2012.

International Search Report and Written Opinion for PCT/US2013/026054, mailed May 25, 2013.

International Search Report and Written Opinion for Application No. PCT/US2013/029905 mailed Jun. 3, 2013.

Brunauer et al., Adsorption of Gases in Multimolecular Layers. J Am Chem Soc. 1938;60(2):309-19.

Hassoun et al., A High-Performance Polymer Tin Sulfur Lithium Ion Battery. Angew. Chem. Int. Ed. 2010, 49, 2371-2374.

Hayashi et al., All-solid-state rechargeable lithium batteries with Li2S as a positive electrode material. Journal of Power Sources 183 (2008) 422-426.

Lai et al., Synthesis and Electrochemical Performance of Sulfur/Highly Porous Carbon Composites. J. Phys. Chem. C 2009, 113, 4712-4716.

Ronci et al., A novel approach to in situ diffractometry of intercalation materials: the EDXD technique. Preliminary results on LiNi0.8Co0.2O2. Electrochem Solid-State Lett. 2000;3(4):174-7.

Takeuchi et al., Preparation of electrochemically active lithium sulfide—carbon composites using spark-plasma-sintering process. Journal of Power Sources 195 (2010) 2928-2934.

Wang et al., Polymer lithium cells with sulfur composites as cathode materials. Electrochimica Acta 48 (2003) 1861-1867.

Zhang et al., Enhancement of long stability of sulfur cathode by encapsulating sulfur into micropores of carbon spheres. Energy & Environmental Science. 2010, 3, 1531-1537.

European Office Action for EP09700611.8 mailed Dec. 4, 2013.

Office Communication for JP 2010-541565 mailed Dec. 25, 2013 and English translation thereof.

Notice of Preliminary Rejection for KR 10-2010-7017571 mailed Jan. 30, 2015 and English translation thereof.

Ahn, et al., "Electrochemical Properties of Sulfur with Various Particle Size for Lithium Sulfur Batteries" Proceedings of the Power Sources Conference (2010), 44th, 130-133 Coden: PPOCFD.

Elazari et al. Morphological and structural studies of composite sulfur electrodes upon cycling by HRTEM, AFM and Raman spectroscopy. Journal of the Electrochemical Society. 2010; 157(10):A1131-A1138. Aug. 26, 2010.

He et al., Distribution of sulphur and electrochemical properties of nickel sulphur coatings electrodeposited on the nickel foam as hydrogen evolution reaction cathodes. Material Letters. Aug. 15, 2005; 59:3968-3972.

Jun et al., Synthesis of New, Nanoporous Carbon with Hexagonally Ordered Mesostructure. JACS 2000;112(43):10712-3. doi: 10.1021/ja002261e. Oct. 12, 2010.

Zhang et al., A three-dimensional tin-coated nanoporous copper for lithium-ion battery anodes. Journal of Power Sources. 2011; 196:6915-6919. Dec. 21, 2010.

Zheng et al., Li[Ni1/3Mn1/3Co1/3]O2-based electrodes for PHEV applications: an optimization. ECS Transactions. 2008;11(32): 1-9.

* cited by examiner

METHOD OF FORMING ELECTRODES COMPRISING SULFUR AND POROUS MATERIAL COMPRISING CARBON

RELATED APPLICATIONS

This application is a National Stage filing under 35 U.S.C. §371 of International Patent Application No. PCT/US2009/000090, filed Jan. 8, 2009, which claims priority under 35 U.S.C. §119(e) to U.S. Provisional Patent Application Ser. No. 61/010,330, filed Jan. 8, 2008, each of which is incorporated herein by reference in its entirety for all purposes.

FIELD OF THE INVENTION

The invention generally relates to electrodes, electrochemical cells, and related methods.

BACKGROUND OF THE INVENTION

A typical electrochemical cell has a cathode and an anode which participate in an electrochemical reaction during operation of the cell. The electrodes may contain an electroactive material that can interact with one or more cell component(s) to facilitate the conduction of ions between electrodes.

Some electrodes may be formed by coating a conductive substrate, including porous conductive substrates, with an electroactive material, often in the presence of a binder material to enhance adhesion and cohesion of the electroactive material to the electrode. However, current methods for fabricating electrodes using a binder material generally cannot achieve high loading of electroactive material without generating significant mechanical problems in the finished electrode. For example, the conductive substrate may be coated using a slurry containing an electroactive material and an insoluble binder material, which typically causes rapid slurry coagulation and can limit the amount of electroactive material loading achieved in the electrode. Alternatively, soluble binders solutions can stabilize the slurry and can facilitate the coating process. However, portions of the resulting electrode structure are often blocked by the deposited materials and may be rendered inaccessible to electroactive species during operation of the cell. This can result in cells having decreased rate capability and electroactive material utilization.

Accordingly, improved methods are needed.

SUMMARY OF THE INVENTION

The present invention provides methods of forming an electrode comprising forming a filler material on a first portion of a porous material, wherein the porous material comprises carbon; forming an electrode material on at least a second portion of the porous material, wherein the electrode material comprises an active electrode species and a binder material; and removing at least some of the filler material from the porous material, thereby forming the electrode.

The present invention also provides methods of forming an electrode comprising contacting a porous material comprising carbon with a filler solution comprising a filler material, such that the filler material forms a coating on a first portion of the porous material, producing a first coated porous material; contacting the first coated porous material with an electrode material comprising an active electrode species and a binder material, such that the electrode material forms a coating on at least a second portion of the porous material, producing a second coated porous material; and removing at least some of the filler material from the second coated porous material, thereby forming the electrode.

The present invention also provides methods of forming an electrode comprising contacting a porous material comprising carbon with an electrode composition comprising an active electrode species, a fluid carrier, and at least 5 wt % of a binder material, relative to the porous material, such that the electrode composition forms a coating on at least a portion of the porous material, producing a coated porous material; and removing at least some of the fluid carrier from the coated porous material, thereby forming the electrode, wherein the electrode comprises an active electrode species loading of at least 1.6 mg/cm$^2$ and a porosity of at least 50%.

The present invention also relates to electrochemical cells comprising a cathode comprising an active electrode species, a porous material comprising carbon, and a binder material, wherein the binder material is at least partially soluble in a fluid carrier in which the active electrode species and the porous material are not appreciably soluble; an anode; and an electrolyte in electrochemical communication with the cathode and the anode, wherein the electrochemical cell has an active material capacity of at least 60% of the active material theoretical capacity.

The present invention also provides methods of forming an electrode comprising forming an electrochemically active electrode precursor comprising a carbon-based electrically-conductive material and an active electrode species; and removing material essentially uniformly from the electrode precursor, thereby increasing surface area of the carbon-based electrically-conductive material, the active electrode species, or both, the surface area exposable to electrolyte during use of the electrode, to form the electrode.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present invention relates to electrochemical cells, electrodes, and related methods.

Generally, the invention involves the use of a removable filler material (e.g., sacrificial material) during fabrication of an electrochemical cell, or component thereof, to produce electrochemical devices having improved cell performance and rate capability. For example, the invention may provide electrochemical cells which exhibit enhanced utilization of electroactive species and/or increased accessibility of electroactive species within the electrochemical cell during operation. In some cases, the invention may provide electrodes which advantageously possess both high loading of an electroactive species (e.g., greater than 1.5 mg/cm$^2$) and good adhesion and cohesion properties. Some electrochemical cells (e.g., rechargeable batteries) of the invention may include a porous electrode comprising one or more electroactive materials, such as an electroactive sulfur-containing material, and a binder material.

One aspect of the invention is the discovery that the use of a filler material (e.g., a sacrificial material) in the fabrication of an electrode can provide several advantages. In some cases, incorporation of filler material within a substrate (e.g, a porous carbon material), and subsequent removal of at least some of the filler material to expose portions of the substrate, may provide improved accessibility of the substrate surface area to other components of the cell. For example, the filler material may be used to maintain the porosity of an electrode material such that the electrolyte may contact interior portions of the electrode (e.g., pores) during cell operation. Another advantageous feature of the invention is the ability to achieve high loading of the active electrode species, as well as improved utilization/accessibility of the active electrode species, while also maintaining the stability and good mechanical properties of the electrode.

Figure 1:
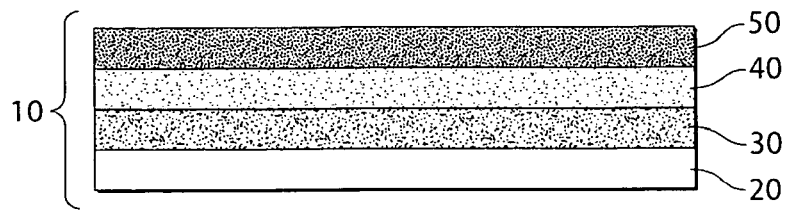
FIG. 1 shows an electrochemical cell, according to one embodiment of the invention.

Although the present invention can find use in a wide variety of electrochemical devices, an example of one such device is provided in FIG. 1 for illustrative purposes only. In FIG. 1, a general embodiment of an electrochemical cell can include a cathode, an anode, and an electrolyte layer in contact with both electrodes. The components may be assembled such that the electrolyte is placed between the cathode and anode in a stacked configuration. FIG. 1 illustrates an electrochemical cell of the invention. In the embodiment shown, cell 10 includes a cathode 30 that can be formed on a substantially planar surface of substrate 20. A porous separator material 40 can be formed adjacent to the cathode 30 and can be deposited into the cathode 30. An anode layer 50 can be formed adjacent porous separator material 40 and may be in electrical communication with the cathode 30. The anode 50 may also be formed on an electrolyte layer positioned on cathode 30. Of course, the orientation of the components can be varied and it should be understood that there are other embodiments in which the orientation of the layers is varied such that, for example, the anode layer or the electrolyte layer is first formed on the substrate. Optionally, additional layers (not shown), such as a multi-layer structure that protects an electroactive material (e.g., an electrode) from the electrolyte, may be present, as described in more detail in U.S. patent application Ser. No. 11/400,781 now abandoned, filed Apr. 6, 2006, entitled, "Rechargeable Lithium/Water, Lithium/Air Batteries" to Affinito et al., which is incorporated herein by reference in its entirety. Additionally, non-planar arrangements, arrangements with proportions of materials different than those shown, and other alternative arrangements are useful in connection with the present invention. A typical electrochemical cell also would include, of course, current collectors, external circuitry, housing structure, and the like. Those of ordinary skill in the art are well aware of the many arrangements that can be utilized with the general schematic arrangement as shown in FIG. 1 and described herein.

As described above, a filler material may be used in a fabrication process to form a component of an electrochemical cell (e.g., an electrode). The term "filler material" as used herein refers to a material that is employed as a mechanical place holder, or a sacrificial material, in a sequence of fabrication steps in which multiple materials are processed for producing a desired structure, such as an electrochemical structure. Once the relevant materials of the structure are formed, at least some of the filler material may be removed while other materials are maintained in place, thereby producing the desired structure. In some embodiments, use of the filler material during the fabrication of porous electrodes may advantageously maintain the porosity of the electrode. In some cases, use of the filler material during the fabrication of porous electrodes may also enhance the accessibility of the active electrode species during operation of the cell by increasing the amount of active electrode species that is formed on the outer surface of the porous electrode, rather than on the surface of interior pores of the porous electrode.

Accordingly, in some embodiments, the invention provides methods for forming electrodes. In some embodiments, the filler material may be formed on a first portion of a material (e.g., porous material), and an electrode material may be formed on at least a second portion of the material. The electrode material may comprise an active electrode species and a binder material, such as soluble binder material. Subsequent removal of at least some of the filler material from the material may then produce the desired electrode structure.

In some cases, the method comprises forming a filler material on at least a portion of a porous material (e.g., a porous material comprising carbon) such that a portion of the porous material surface is coated by the filler material and/or at least some of the pores are "filled" with the filler material. For example, the method may involve contacting the porous material with a filler solution comprising a filler material, such that the filler material forms a coating on a first portion of the porous material, producing a coated porous material. The filler solution may comprise the filler material and at least one fluid carrier in which the filler material is appreciably soluble. Removal of at least some of the fluid carrier, via evaporation or heating, for example, may result in formation of the filler material on the surface of the porous material. In some embodiments, the filler material is a solid. In some embodiments, the filler material is a fluid (e.g., octane). Some examples of filler materials include, but are not limited to, ammonium bicarbonate and water. However, it should be understood that other filler material may be used in the context of the invention, as described more fully below.

In some cases, the filler material may be deposited within interior portions of a porous substrate via thermal cycling of a material having a positive temperature solubility gradient, i.e., a material having a solubility that increases as temperature increases. In illustrative embodiment, the filler material may be formed on the porous material by contacting the porous material with a filler solution comprising a filler material and a fluid carrier at a first temperature in which the filler material is substantially dissolved in the fluid carrier. The temperature of the filler solution and/or porous material may then be reduced to a second, lower temperature that may cause the filler material to precipitate within the pores of the porous material. The process may be repeated (e.g., cycled) until a sufficient amount of filler material is formed within the pores of the porous materials.

In some cases, the filler material may be formed on the porous material via various saturation methods, wherein the porous material may be exposed to a filler material vapor. For example, an inert gas saturation method may be used, wherein the porous material is placed in a closed container through which an inert, dry gas (e.g., nitrogen, argon) is purged at a measured flow rate. A flow of filler material in vapor form may be introduced into the container, alone or in combination with the stream of inert gas. In some cases, a vessel containing small beads may be fluidly attached to the inlet inert gas line, and a small stream of filler material fluid (e.g., octane) may be allowed to drip onto the surface of the small beads. The filler material fluid may then be vaporized into the inert gas stream to form a saturated inert gas, which may be allowed to contact (e.g., pass through) the carbon material and then exit the container.

The filler material may then be formed on the porous substrate by alternately heating and cooling the filler vapor for several cycles as it contacts (e.g., passes through) the porous material. In some cases, a vortex tube may be used to generate the hot inert gas. In some embodiments, ambient saturation methods may be used, wherein the porous material is placed in a closed vessel and suspended (e.g., by a wire cloth) over a solution of filler material at the bottom of the vessel. Alternatively, the porous substrate may be saturated with filler material using a ball mill jar. For example, the ball mill jar may be purged with a dry inert gas, and the porous substrate may be added to the ball mill jar. Filler material vapor may be added, and the porous substrate and filler material vapor may be tumbled until well mixed. In some embodiments, the porous material may be dried prior to saturation.

The filler material may be formed on the porous material in any amount suitable for a particular application. For example, in applications where it is desired that large portions of the porous material contact or are accessible to (e.g., exposed to) other components of the cell (e.g., electrolyte), during fabrication the filler material may be formed on a relatively large portion of the porous material surface and may be later removed or partially removed to expose the desired amount of porous material. Alternatively, in applications where it is desired that small portions of the porous material contact or are accessible to other components of the cell, during fabrication the filler material may be formed on a relatively small portion of the porous material surface. In some cases, upon formation of the filler material on the porous material, the porous material may comprise about 5-95 wt % filler material, relative to the porous material (e.g. porous carbon material). In some cases, the porous material may comprise about 15-85 wt %, 25-75 wt %, 35-65 wt %, or, in some cases, about 45-55 wt % filler material, relative to the porous material. In one set of embodiments, the porous material may comprise about 50 wt % filler material, relative to the porous material (e.g. porous carbon material). Methods of the invention may comprise formation of an electrode material or an electrode composition on at least a portion of the porous material, including portions that comprise filler material and/or portions that are free of filler material. In some cases, the porous material may be treated (e.g., contacted, coated) with an electrode material comprising an active electrode species (e.g., sulfur) and a binder material. Additional materials, fluid carriers, other additives, and/or combinations thereof, may also be applied to the porous substrate in combination with the electrode material.

In some cases, the binder material and the active electrode species may be applied to the porous material from a mixture (e.g., electrode composition) comprising the binder material, the active electrode species, and at least one fluid carrier. Removal (e.g., evaporation or drying) of at least some of the fluid carrier may then form the electrode material on the surface of the porous material. In some cases, the mixture may be provided as a homogeneous solution, a heterogeneous dispersion or slurry, or the like. Those of ordinary skill in the art would be able to select the appropriate combination of binder material, active electrode species, and fluid carrier to produce a desired mixture. For example, simple screening tests may be conducted by simply combining small amounts of the mixture components (e.g., binder material, active electrode species, fluid carrier, etc.) to determine whether a solution or slurry is formed. In some cases, the mixture may be further processed (e.g,. heated, stirred, sonicated, milled, etc.) prior to application to the porous substrate. The mixture may be processed to provide uniform mixture, to prevent agglomeration, or to impart other desired characteristics to the mixture. In one embodiment, the mixture may be milled prior to application to the porous substrate.

In some embodiments, the electrode composition comprises an active electrode species (e.g., sulfur), a fluid carrier, and at least 5 wt %, at least 10 wt %, at least 15 wt %, at least 20 wt %, at least 25 wt %, at least 30 wt %, or greater, in some cases, of a binder material, relative to the porous material.

As described herein, the use of soluble binder materials may simplify the coating process and can allow for the use of increased amounts of active electrode material within the mixture, generating electrodes with high loading of an electroactive species. In some embodiments, the binder material may be at least partially soluble in the fluid carrier of the electrode composition. In some cases, the binder material may be at least partially soluble in a fluid carrier in which the active electrode species, porous material, and/or filler material are not appreciably soluble. In some cases, the mixture may be a slurry comprising an active electrode species, a binder material, and a fluid carrier in which the binder material is at least partially soluble and in which the active electrode species and the porous material are not appreciably soluble.

In some cases, the electrode composition (e.g., slurry) may advantageously comprise a high solid loading relative to known methods. For example, using previous methods, application of a mixture comprising a high solid loading to a porous carbon substrate may result in undesired absorption of the fluid carrier by the carbon substrate, which can destabilize the mixture and/or cause precipitation of the binder material within the mixture. However, using methods of the invention, mixtures having high solid loading may be readily applied to carbon substrates comprising filler material. In some cases, the filler material can block the pores of the porous carbon substrate to minimize or prevent absorption of the fluid carrier by the porous carbon substrate. In some embodiments, the electrode may comprise an active electrode species loading of at least 1.6 mg/cm$^2$. The terms "active electrode species loading" or "electroactive species loading" refer to the amount of active electrode species that is formed or "loaded" on the electrode. In some embodiments, the mixture may have a solid content (e.g., active electrode species content) of at least 10 wt %, at least 20 wt %, at least 30 wt %, at least 40 wt %, or greater. The mixture may also include other additives, such as plasticizers and/or crystallization modifiers. In some embodiments, the additives may be selected to be compatible with (e.g., inert to, miscible with) other components of the slurry, such that the additives do not adversely affect the performance of the cell. Examples of additives include, but are not limited to, ethylene carbonate, propylene carbonate, polyethylene glycol and polypropylene glycol.

In some embodiments, at least a portion of the substrate (e.g., porous material) may be treated, prior to forming the electrode material on the porous material, to alter (e.g., enhance) the affinity of the porous material for the filler material, active electrode species, binder material, or other components associated with the fabrication process. For example, the porous material may be treated with an appropriate chemical that modifies the hydrophilicity, hydrophobicity, or other characteristic, of the porous material. In some cases, a polymeric material may be formed on the porous material, or portion thereof prior to formation of a filler material on the porous material to enhance the interaction between the porous material and the filler material. In some embodiments, the polymeric material may be poly(ethylene glycol), which may increase the affinity of the substrate for hydrophilic filler materials such as water. Those of ordinary skill in the art would be able to select the appropriate chemicals that may impart a desired characteristic (e.g., hydrophilicity, hydrophobicity) to the surface of the porous material.

In some embodiments, the substrate may be treated to produce a substantially anhydrous or dry material. For example, an untreated, porous, carbon material may include water within its pores, which may hinder its performance and/or ability to be processed using methods described herein. In some cases, it may be desirable to remove water from the carbon substrate to provide a suitable surface on which materials (e.g., filler material, binder material) may be formed. The water may be at least partially removed from the substrate using various methods, including hot inert gas cycling or desiccant drying. Hot inert gas cycling typically involves placing the substrate in a sealed container through which an inert, dry gas (e.g., nitrogen, argon) is passed. The inert gas may be allowed to pass through the carbon material and then exit the container. The inert gas may be alternately heated and cooled for several cycles, thereby heating and cooling the substrate, and after the last cycle, the container may be sealed under inert gas for storage. Desiccant drying involves placing a substrate in a dessicator comprising water-absorbing beads, to remove water vapor from the surface of the substrate. The filler material, or portion thereof, may be removed from the porous material by various methods. For example, at least some of the filler material may be removed by heating the substrate. In other embodiments, the filler material may be at least partially removed by contacting (e.g., rinsing) the substrate with a fluid carrier or other chemical(s). Those of ordinary skill in the art would be able to select the appropriate method(s) for removing a particular filler material. For example, filler materials having a boiling point lower than the decomposition temperature of other components of the electrode may be removed at least in part via heating. In another example, the filler material may be substantially soluble in a fluid carrier in which other components of the electrode are not appreciably soluble, such that the filler material may be removed at least in part via rinsing with the fluid carrier. The filler material may be removed at any point during or after the fabrication process, depending on the desired application. In some cases, the filler material may be removed from the porous material during formation of the electrode material.

The filler material, or portions thereof, may then be selectively removed to reveal portions of the underlying porous material, such that the resulting porous material has a surface comprising electrode material (comprising active electrode species and binder material) positioned at selected locations and conductive substrate material exposed at other locations on the surface. As described herein, the ability to selectively remove at least some of the filler material may advantageously increase the amount of the porous material surface area that is accessible to other components of the cell, while other materials of the electrode (e.g., active electrode species, binder material) are maintained on or within the electrode surface.

The amount of porous material surface area may be determined by the porosity of the electrode. That is, an increase in the porosity of the electrode may indicate an increase in the amount of porous material surface area of the electrode. In some embodiments, the electrode may have a porosity of at least 50%, at least 60%, at least 70%, at least 80%, at least 90%, or greater. The porosity of the electrode may be determined using known methods, such as BET measurements.

In an illustrative embodiment, a porous carbon material may be treated (e.g,. coated) with poly(ethylene glycol) to increase the affinity of the porous carbon material for aqueous fluid carriers. The porous carbon material may then be exposed to (e.g., contacted by) a liquid filler material such as water, which can fill at least a portion of the pores of the porous carbon material. Next, a slurry comprising an electrode material in the presence of hexane as a fluid carrier may be applied to the porous carbon material. The electrode material may comprise sulfur as the active electrode species and a polymeric soluble binder, such as poly(ethylene-co-propylene-co-5-methylene-2-norbornene). The porous carbon material may then be heated at a first temperature to remove the hexane, resulting in formation of the electrode material on the surface of the porous carbon material. Water (e.g., filler material) may then be removed by heating the porous carbon material at a higher, second temperature to produce the electrode.

In one set of embodiments, an electrochemically active electrode precursor may be provided, comprising a carbon-based electrically-conductive material and an active electrode species. For example, the electrode precursor may include a porous carbon substrate and an active electrode species (e.g., sulfur) formed on the substrate. Material may be removed from the electrode precursor essentially uniformly to form the electrode. As used herein, removing material "essentially uniformly" from the electrode precursor means that material is removed uniformly throughout the bulk of the electrode precursor. For example, removing material "essentially uniformly" from the electrode precursor may not refer to removal of discrete portion(s) of the electrode material via, for example, etching. In some cases, at least some filler material may be removed from the electrode precursor. Removal of material may increase the surface area of the carbon-based electrically-conductive material that is exposed or exposable to electrolyte during use of the electrode, the active electrode species, or both. In some cases, removal of material from the electrode precursor may produce an electrode having an active material capacity relative that is at least 60% of the active material theoretical capacity.

Electrodes may be prepared using methods as described herein, and may be incorporated within electrochemical devices. Accordingly, some embodiments of the invention also provide electrochemical cells. The electrochemical cell may comprise a cathode, an anode, and an electrolyte in electrochemical communication with the cathode and the anode. In some embodiments, the cathode may comprise an active electrode species, a porous material comprising carbon, and a binder material (e.g., a soluble binder material). In some cases, the cathode comprises sulfur as the electrode active material. As described herein, electrodes fabricated using methods of the invention may have high sulfur loading, relative to known cells. In some embodiments, the electrode has a sulfur loading of at least 1.5 mg/cm$^2$ (e.g., 1.6 mg/cm$^2$), at least 2.5 mg/cm$^2$, at least 5.0 mg/cm$^2$, or, in some cases, greater.

In an illustrative embodiment, the electrode may have a sulfur loading of 4.3 mg/cm$^2$ and an electrode material thickness of about 190 microns.

In some embodiments, the electrochemical cell may exhibit high active electrode species utilization, i.e., the electrode active material may be readily accessible to and may interact with other components or species within the cell during operation, such that cell performance is enhanced. In some cases, the active material capacity may be at least 60%, at least 70%, at least 80%, or, in some cases, at least 90% of the active material theoretical capacity. The "active material theoretical capacity" for a particular material may be calculated using the following formula:

$$Q=1/3600*n*F/M,$$

wherein:
Q=theoretical capacity Ah/g (ampere hour per gram),
3600=number of seconds in one hour,
n=number of electrons involved into electrochemical process per one molecule of material,
F=Faraday constant, 96485 C/mol, and
M=material molecular mass, gram.

Figure 3:
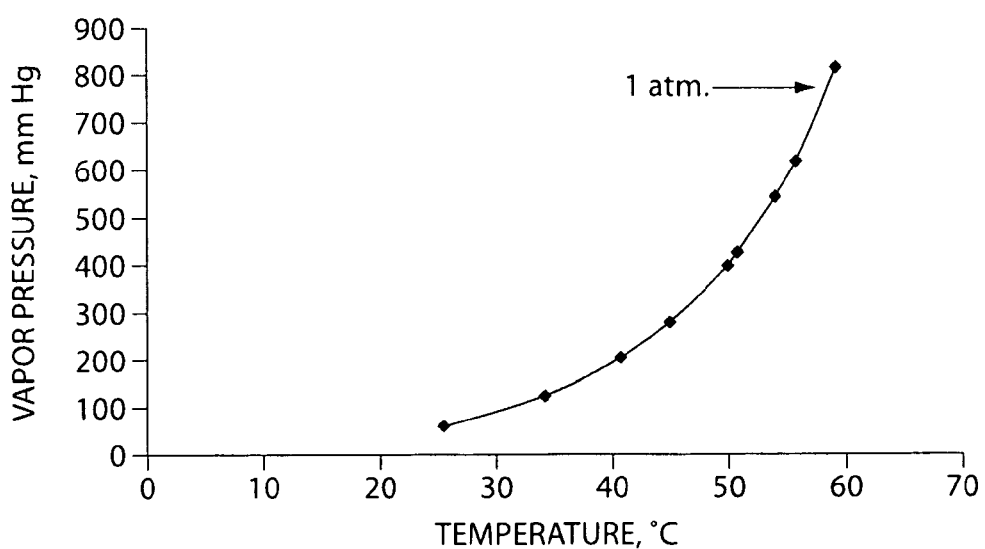
FIG. 3 shows a graph of the vapor pressure of ammonium bicarbonate as a function of temperature.

Those of ordinary skill in the art would be able to calculate the active material theoretical capacity and compare it to the experimental active material capacity for a particular material to determine whether or not the experimental capacity is at least 60%, or greater, of the theoretical capacity. A wide range of materials may be suitable for use as a filler material, as described herein. In some cases, the filler material may be selected such that it has an affinity for a particular substrate, such as a carbon substrate. In some cases, the filler material be selected such that it may be stable (e.g., does not decompose, delaminate, react, dissolve, etc.) during formation of the electrode material and, upon formation of the electrode material, may readily decompose into one or more gases or vapors, facilitating rapid and complete removal. Those of ordinary skill in the art would be able to identify and select materials that exhibit this behavior by, for example, considering the chemical structure, or solubility, volatility, and/or vapor pressure of the filler material at a given temperature. In an illustrative embodiment, FIG. 3 shows a graph of the vapor pressure of ammonium bicarbonate as a function of temperature, indicating that may be decomposed/removed at temperatures of around 50-60° C., or higher.

In other embodiments, the filler material may be selected such that it is substantially insoluble with respect to the electrode composition applied to the porous material during formation of the electrode material. Simple screening tests can be used to determine whether the filler materials are soluble or insoluble in a particular environment where they are desirably maintained in a structure during processing. A simple test, which can be carried out in a routine laboratory environment, involves simply exposing the filler material to a variety of candidate processing solvents to determine solubility. When a class of filler materials has been identified as potentially suitable for use in the invention in this way, individual members of that class can be screened prior to use in an actual processing environment, to determine their efficacy.

The filler material may be either a liquid, solid, or combination thereof. Examples of suitable filler materials include, but are not limited to, organic and inorganic salts, such as ammonium carbonate, ammonium bicarbonate, and azidocarbonamide, sodium bicarbonate, potassium bicarbonate, sodium carbonate and sodium borohydride. In one set of embodiments, the filler material is ammonium carbonate or ammonium bicarbonate. In some embodiments, the filler material is a liquid, such as water or a hydrocarbon (e.g., octane).

In some cases, the filler material may be combined with a fluid carrier to form a filler solution, which may be applied to the porous substrate. Suitable fluid carriers include aqueous fluid carriers, non-aqueous fluid carriers, and combinations thereof. Those of ordinary skill in the art would be able to select the appropriate fluid carrier to form a filler solution, and simple screening tests may be used to determine whether a filler material is sufficiently soluble in a fluid carrier to facilitate formation of the filler material on the surface of the porous material. For example, small amounts of the filler material may be combined with a series of fluid carriers to determine compatibility. In some embodiments, the fluid carrier may have a relatively low boiling point such that it may be removed at moderate temperature, and may have a low vaporization enthalpy to provide a high drying rate. For example, the fluid carrier may be have a boiling point that is 100° C. or less, 90° C. or less, 80° C. or less, or, in some cases, lower.

In some embodiments, fluid carriers suitable for use in the filler solution include halogenated or partially halogenated hydrocarbons, such as methylene chloride, hydrocarbons such as pentane or hexane, aromatic compounds such as benzene, toluene, or xylene, alcohols such as methanol, ethanol, isopropanol, other aqueous solvents such as water, mixtures thereof, and the like.

As described herein, a "binder material" refers to any material that, when present within the electrode, may enhance adhesion and cohesion of the active electrode species to the electrode. In some cases, a combination of binder materials may be used. Those of ordinary skill in the art would be able to select appropriate binder materials suitable for use in the invention, in combination with other materials associated with methods and electrochemical cells described herein. The binder material may be selected such that it is compatible with (e.g., inert with respect to) other components of the cell including, but not limited to, the cathode, the anode and the electrolyte. For example, the electrochemical cell may comprise polysulfides, and the binder material may be selected such that it does not contain particular functional groups such as carbonyl groups (e.g,. esters, ketones, aldehydes, and the like), which may react with polysulfides within the cell during operation and may contaminate the cell with substantially irreversibly-formed side products. The binder material may also be selected to exhibit good adhesion to the porous material (e.g., porous carbon material) and/or does not crack or become delaminated during processing or during cell operation. In some embodiments, binder materials which are substantially non-toxic may be used.

In some cases, the binder material may be selected to be substantially insoluble with respect to the electrolyte, i.e., the binder material may not be dissolved by the electrolyte, and/or to be appreciably soluble with respect to a fluid carrier. The binder material may be provided in a solvent in which the binder material is substantially soluble. In some cases, the binder material may be substantially soluble in non-aqueous fluid carriers. In some cases, the binder material may be substantially soluble in aqueous fluid carriers.

In some embodiments, the binder material may be a polymeric material. Examples of polymer binder materials include, but are not limited to, polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers, styrene-butadiene rubbers (SBR), polyimides or ethylene-vinyl acetate copolymers. In some cases, the binder material may be substantially soluble in aqueous fluid carriers and may include, but is not limited to, cellulose derivatives, typically methylcellulose (MC), carboxy methylcellulose (CMC) and hydroxypropyl methylcellulose (HPMC), polyvinyl alcohol (PVA), polyacrylic acid salts, polyacryl amide (PA), polyvinyl pyrrolidone (PVP) or polyethylene oxide (PEO).

Figure 2:
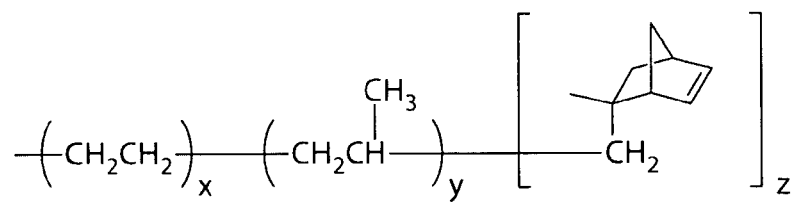
FIG. 2 shows an example of a binder material, according to one embodiment of the invention.

In one set of embodiments, the binder material is poly (ethylene-co-propylene-co-5-methylene-2-norbornene) (EPMN), which may be chemically neutral (e.g,. inert) towards cell components, including polysulfides. FIG. 2 shows the chemical structure of EPMN. EPMN may also provide sufficient adhesion to, for example, porous carbon materials, or to other substrate materials including metal substrates (e.g., aluminum).

As described above, the binder material may be combined with a fluid carrier, in addition to other material such as an active electrode species, during formation of the electrode material on the porous material. In some cases, a fluid carrier in which the binder material is appreciably miscible or soluble may be used. In some embodiments, the fluid carrier may be selected such that the filler material is not appreciably miscible or soluble with respect to the fluid carrier, such that the filler material formed on the porous material remains substantially intact during formation of the electrode material.

In some embodiments, the fluid carrier may be selected such that the active electrode species is not appreciably miscible or soluble with respect to the fluid carrier. This may be advantageous in selectively arranging the electrode material at certain locations on the porous material. For example, it may be desired to form the electrode material primarily on the surface of a porous material and minimizing or preventing formation within interior locations (e.g., pores) of the porous material. Treatment of the porous material with an electrode composition comprising a binder material, an active electrode species, and a fluid carrier in which both the binder material and active electrode species are appreciably soluble may result in undesired deposition or crystallization of the active electrode species within the pores of the porous material. However, treatment with an electrode composition comprising a binder material, an active electrode species, and a fluid carrier in which the binder material is appreciably soluble and the active electrode species is not appreciably soluble can result in deposition of the active electrode species primarily at the surface of the porous material, which can improve utilization of the active electrode species during cell operation.

In an illustrative embodiment, sulfur may be formed on a porous carbon substrate in the presence of water and a water-soluble binder material, wherein the sulfur is not appreciably soluble in water. This may produce an electrode where a relatively high loading of sulfur may be formed on the exterior surface of the porous carbon material, rather than within the pores, resulting in enhanced accessibility of the sulfur during operation of the cell.

In some cases, the fluid carrier used during formation of the electrode material may be selected such that it exhibits a high vaporization rate at a temperature below the temperature at which the filler material may decompose to minimize or prevent premature removal of the filler material. That is, the fluid carrier used during electrode material formation may be selected such, within a set temperature range, the vapor pressure of the fluid carrier is higher than the vapor pressure of any decomposition products formed by the filler material. For example, the fluid carrier may have a boiling point or vaporization enthalpy that is below the decomposition temperature or vaporization enthalpy of the filler material. This may allow for removal of the fluid carrier to form the electrode material, while minimizing or preventing premature removal of the filler material.

Any fluid carrier may be suitable for use in electrode compositions, including aqueous fluid carries, non-aqueous fluid carriers, or combinations thereof. Examples of fluid carriers which may be used in methods of the invention include solvents such as benzene, p-cresol, toluene, xylene, diethyl ether, glycol monomethyl or dimethyl ether, petroleum ether, heptane, hexane, pentane, cyclohexane, methylene chloride, chloroform, carbon tetrachloride, dioxane, tetrahydrofuran (THF), methanol, ethanol, isoproanol, dimethyl sulfoxide, dimethylformamide, hexamethyl-phosphoric triamide, water, ethyl acetate, acetone, pyridine, triethylamine, picoline, mixtures thereof, or the like. Those of ordinary skill in the art would be able to select the appropriate fluid carrier suitable for use in a particular application. For example, the fluid carrier may be selected based on its volatility (e.g,. boiling point), solubility or miscibility with other materials, or the like.

Figure 5:
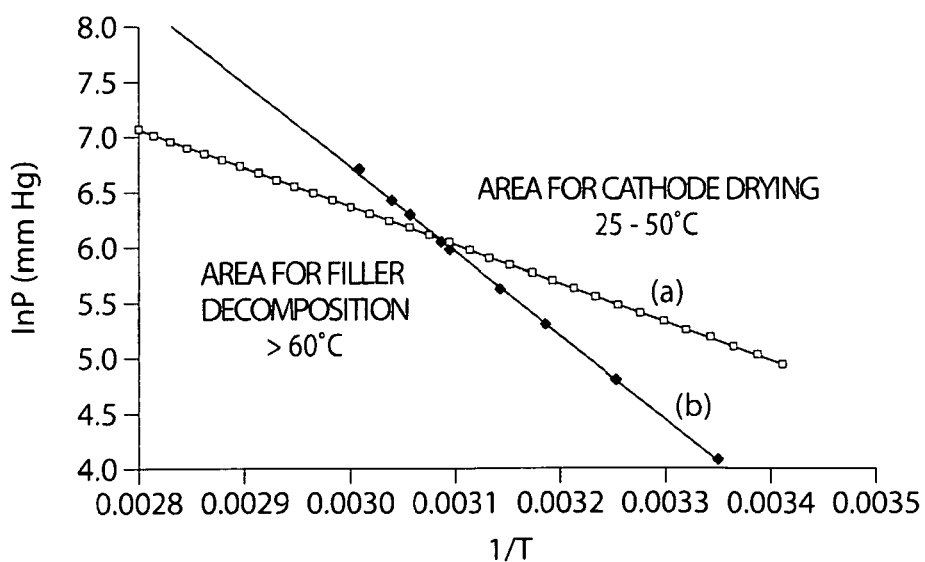
FIG. 5 shows an Arrhenius plot for the vapor pressures of (a) hexane and (b) ammonium bicarbonate.

In an illustrative embodiment, a porous substrate may comprise ammonium bicarbonate as the filler material, and hexane may be used as the electrode composition fluid carrier during formation of the electrode material on the porous material. Hexane has a boiling point of 68.8° C. and a vaporization enthalpy of 330 J/g. FIG. 5 shows an Arrhenius plot for the vapor pressures of (a) hexane and (b) ammonium bicarbonate. As shown in FIG. 5, at temperatures below 50-60° C., the hexane vapor pressure exceeds the vapor pressure of ammonium bicarbonate. Thus, a porous material comprising ammonium bicarbonate as a filler material may be treated (e.g., coated) with an electrode material in the presence of hexane and the hexane may be removed at a temperature below about 50-60° C. to form the electrode material on the porous substrate while the filler material remains intact. Upon evaporation of the hexane and formation of the electrode material, the temperature may be increased above 60° C. to remove (e.g., decompose) the ammonium bicarbonate and expose the pores of the porous substrate.

As described herein, the filler material, binder material, fluid carrier(s), as well as other materials associated with the fabrication process, may be selected to have a particular relationship with respect to each other based on properties such as solubility, vapor pressure, decomposition temperature, and the like, such that a fabrication process may be carried out to produce a desired electrochemical structure. That is, the filler material, binder material, and other materials may be selected such that the desired materials may be desirably formed and/or maintained on the substrate during the fabrication process, while reducing or preventing decomposition or undesired loss of material.

For example, a hydrophobic filler material may be used in combination with a hydrophilic binder material. In another example, a hydrophilic filler material may be used in combination with a hydrophobic binder material. In addition, the binder and filler materials may be selected in combination with one or more fluid carriers such that the filler material may be removed from the substrate (e.g., electrode) after formation of the binder material on the substrate. In some embodiments, the filler material is a hydrophilic material and the binder material is soluble in a hydrophobic solvent. In some embodiments, the filler material is a hydrophobic material and the binder material is soluble in a hydrophilic solvent. In some cases, the filler material may exhibit some solubility in the filler fluid carrier, and may be substantially insoluble in the binder fluid carrier. In some cases, the binder material may exhibit some solubility in the binder fluid carrier, and may be substantially insoluble in the filler fluid carrier.

As used here, an "active electrode species" or "electroactive species" refers to a species associated with an electrode (e.g., cathode, anode) that undergoes an electrochemical reaction during operation of the cell. For example, an active electrode species may undergo oxidation or reduction during charge/discharge of the electrochemical cell.

Suitable electroactive materials for use as cathode active materials in the cathode of the electrochemical cells of the invention include, but are not limited to, electroactive transition metal chalcogenides, electroactive conductive polymers, electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, electroactive materials for use as cathode active materials in electrochemical cells described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al. of the common assignee, and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

In one embodiment, an electroactive sulfur-containing material of a cathode active layer comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The cathode active layers of the present invention may comprise from about 20 to 100% by weight of electroactive cathode materials (e.g., as measured after an appropriate amount of solvent has been removed from the cathode active layer and/or after the layer has been appropriately cured). In one embodiment, the amount of electroactive sulfur-containing material in the cathode active layer is in the range of 5-30% by weight of the cathode active layer. In another embodiment, the amount of electroactive sulfur-containing material in the cathode active layer is in the range of 20% to 90% by weight of the cathode active layer.

Non-limiting examples of suitable liquid media (e.g., solvents) for the preparation of cathodes (as well as other components of cells described herein) include aqueous liquids, non-aqueous liquids, and mixtures thereof. In some embodiments, liquids such as, for example, water, methanol, ethanol, isopropanol, propanol, butanol, tetrahydrofuran, dimethoxyethane, acetone, toluene, xylene, acetonitrile, cyclohexane, and mixtures thereof can be used. Of course, other suitable solvents can also be used as needed.

Positive electrode layers may be prepared by methods known in the art. For example, one suitable method comprises the steps of: (a) dispersing or suspending in a liquid medium the electroactive sulfur-containing material, as described herein; (b) optionally adding to the mixture of step (a) a conductive filler and/or binder; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode active layer.

Suitable negative electrode materials for anode active layers described herein include, but are not limited to, lithium metal such as lithium foil and lithium deposited onto a conductive substrate, and lithium alloys (e.g., lithium-aluminum alloys and lithium-tin alloys). While these are preferred negative electrode materials, the current collectors may also be used with other cell chemistries.

Methods for depositing a negative electrode material (e.g., an alkali metal anode such as lithium) onto a substrate may include methods such as thermal evaporation, sputtering, jet vapor deposition, and laser ablation. Alternatively, where the anode comprises a lithium foil, or a lithium foil and a substrate, these can be laminated together by a lamination process as known in the art to form an anode.

Positive and/or negative electrodes may optionally include one or more layers that interact favorably with a suitable electrolyte, such as those described in U.S. Provisional Application Ser. No. 60/872,939, filed Dec. 4, 2006 and entitled "Separation of Electrolytes," by Mikhaylik et al., which is incorporated herein by reference in its entirety.

The electrolytes used in electrochemical or battery cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material is electrochemically and chemically unreactive with respect to the anode and the cathode, and the material facilitates the transport of ions (e.g., lithium ions) between the anode and the cathode. The electrolyte is electronically non-conductive to prevent short circuiting between the anode and the cathode.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Heterogeneous electrolyte compositions that can be used in batteries described herein are described in U.S. Provisional Application Ser. No. 60/872,939, filed Dec. 4, 2006.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

In some cases, aqueous solvents can be used as electrolytes for lithium cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al.

In some embodiments, electrochemical cells may further comprise a separator interposed between the cathode and the anode. The separator may be a solid non-conductive or insulative material which separates or insulates the anode and the cathode from each other preventing short circuiting, and which permits the transport of ions between the anode and the cathode.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as polyethylenes and polypropylenes, glass fiber filter papers, and ceramic materials. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

The figures that accompany this disclosure are schematic only, and illustrate a substantially flat battery arrangement. It is to be understood that any electrochemical cell arrangement can be constructed, employing the principles of the present invention, in any configuration. For example, additional configurations are described in U.S. patent application Ser. No. 11/400,025 now U.S. Pat. No. 7,771,870, filed Apr. 6, 2006, entitled, "Electrode Protection in both Aqueous and Non-Aqueous Electrochemical Cells, including Rechargeable Lithium Batteries," to Affinito et al., which is incorporated herein by reference in its entirety.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

EXAMPLES

Example 1

The following examples described the formation of a filler material within the pores of a porous carbon material, according to one embodiment of the invention.

Figure 4:
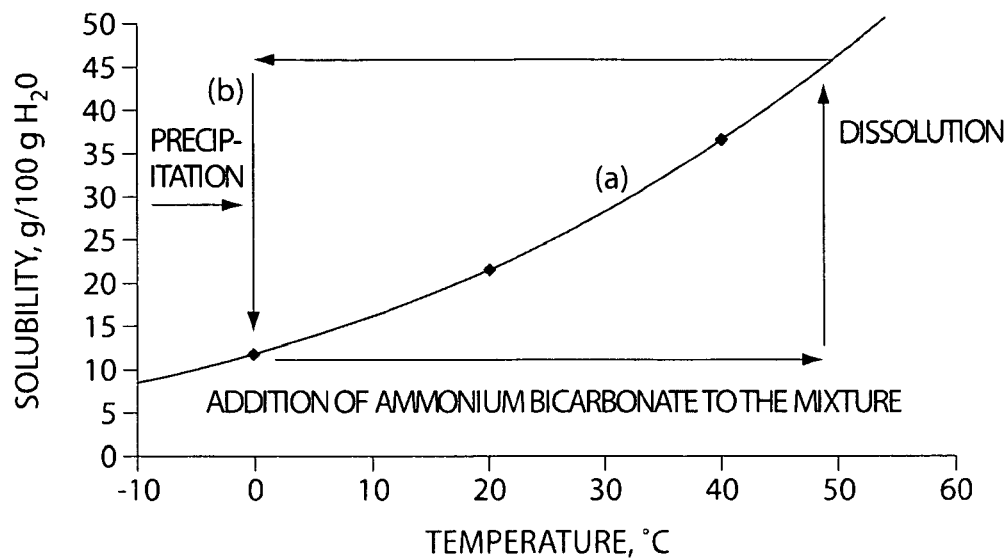
FIG. 4 shows a graph of (a) the solubility of ammonium bicarbonate in water as a function of temperature, and (b) the thermal cycling diagram of ammonium bicarbonate in water.

A filler material was formed on porous carbon material by thermal cycling to repeatedly dissolve and precipitate a filler material within the pores of the porous carbon material. In this example, ammonium carbonate or ammonium bicarbonate was used as the filler material, since each exhibits a positive temperature solubility gradient in water, i.e., the solubility of the ammonium carbonate or ammonium bicarbonate in water increases with increasing temperature and decreases with decreasing temperature. FIG. 4 shows a graph of (a) the solubility of ammonium bicarbonate in water as a function of temperature, and (b) the thermal cycling diagram of ammonium bicarbonate in water.

According to the thermal cycling diagram in FIG. 4B, an aqueous solution of ammonium carbonate or ammonium bicarbonate was contacted with the porous carbon material and was heated to about 50° C., filling the carbon pores with the solution. The solution temperature was then reduced to near 0° C., causing the filler material to precipitate within the carbon pores. The process was repeated 2-3 times to deposit the desired amount of filler material within the pores. A filler content of approximately 75-90% by weight was achieved, relative to the porous carbon material.

Example 2

In the following example, an electrochemical cell was prepared using a filler material and a soluble binder material, as described herein, and its sulfur specific capacity was evaluated.

A composite comprising XE2 carbon (11.1 wt %) and ammonium bicarbonate (88.9 wt %) was prepared by adding XE2 to a saturated solution of ammonium bicarbonate at 50° C. or greater. The mixture was then cooled to 0° C. and $NH_4HCO_3$ was allowed to precipitate in the carbon pores. The precipitated $NH_4HCO_3$ was filtered to provide the XE2 composite, which was then washed with ethanol. The composite (21.37 g) was then mixed with 33.3 g of a solution of 3 wt % EPDMN binder in hexane and 6.63 g of sulfur powder. An additional 35.3 g of hexane was added to the slurry mixture, which was then milled for 40 minutes with stainless steel balls in a vial.

To coat the cathode, the milled slurry mixture was hand drawn on a carbon-coated 12 micron Al substrate (AL Rexam primer), and the coated cathode was dried at +70° C. in the oven for 1 hour to remove the solvent and filler material. The resulting composite contained sulfur (66.3 wt %), XE2 (23.7 wt %), and EPDMN (10 wt %). The cathode had a good adhesion and cohesion. The sulfur coated loading was 5.18 mg/cm$^2$.

Electrochemical cells were then assembled using the coated cathode described above and 6 mil Li foil as the electrodes (active area 33 cm$^2$), 9 m Tonen separator and 1.02 g electrolyte. The electrolyte contained primarily 1,3-Dioxolane (DOL) and 1-Methoxy-2-ethoxyethane (MEE), with various and lower amounts of $(CF_3SO_2)_2NLi$ and $LiNO_3$ depending upon the specific experiment. In one specific experiment, the electrolyte contained 69.16 wt % DOL, 21.34 wt % MEE, 6.72 wt % $(CF_3SO_2)_2NLi$, and 2.77 wt % $LiNO_3$. The cell was cycled at 15 mA discharge to 1.7 V and 15 mA charge to 2.5 V. The sulfur specific capacity at the 5$^{th}$ cycle was 1048 mAh/g and 1011 mAh/g at the 40$^{th}$ cycle.

As a control experiment, the same electrochemical cell was prepared as described above, except that instead of an XE2-ammonium bicarbonate composite, a pure XE2 without filler was used to prepare the slurry and coat the cathode. The cathode coating had very poor adhesion and cohesion to the XE2 substrate. The cathode had a sulfur loading of 2.17 mg/cm$^2$, and was assembled into an electrochemical cell as described above. The sulfur specific capacity was 937 mAh/g at the 5$^{th}$ cycle and dropped to 845 mAh/g at the 40$^{th}$ cycle.

Example 3

In the following example, an electrochemical cell was prepared using a filler material and a soluble binder material, as described herein, and its sulfur specific capacity was evaluated.

An XE2-ammonium carbonate $(NH_4)_2CO_3$ composite having an XE2 content of 15.7 wt % and an ammonium bicarbonate content of 84.3 wt % was prepared according to the method described in Example 2. The composite was then mixed with 33.3 g of a solution of 3 wt % EPDMN binder in hexane and 6.63 g of sulfur powder. The XE2-$(NH_4)_2CO_3$ composite was then coated as described in Example 2, using a milled hexane slurry mixture containing 9.97% sulfur, 22.06% XE2-$(NH_4)_2CO_3$ composite, and 1.5% EPMN soluble binder, by weight. The coated cathode was dried at +70° C. in the oven for 1 hour to remove the solvent and filler material. The resulting composite contained sulfur (66.3 wt %), XE2 (23.7 wt %), EPDMN (10 wt %). The cathode had a good adhesion and cohesion. The sulfur coated loading was 4.3 mg/cm$^2$.

Electrochemical cells were then assembled similar to Example 2 using the coated cathode described above. The cell was cycled at conditions similar to Example 2. Sulfur specific capacity at 5$^{th}$ cycle was 1214 mAh/g.

As a control experiment, the same electrochemical cell was prepared as described above, except that instead of an XE2-ammonium bicarbonate composite, a pure XE2 without filler was used to prepare the slurry and coat the cathode. The cathode coating had low sulfur loading and very poor adhesion and cohesion to the XE2 substrate, and, when assembled into an electrochemical cell, displayed poor sulfur specific capacity, similar to the control experiment described in Example 2.

Example 4

In the following example, an electrochemical cell was prepared using a filler material and a soluble binder material, as described herein, and its sulfur specific capacity was evaluated.

An XE2-water composite having an XE2 content of 28.5 wt % and water content of 71.5% was prepared by adding carbon to boiling water, stirring and cooling to room temperature. The XE2-$H_2O$ composite was then coated using a milled hexane slurry mixture containing 9.97 g of XE2-$H_2O$ composite, 7.96 g sulfur, 40 g of 3 wt % solution of EPDMN in hexane, and 10 g hexane. The coated cathode was dried at +70° C. in the oven for 1 hour to remove the solvent and than for 1 hour at 100° C. to remove filler material. The resulting composite contained sulfur (66.3 wt %), XE2 (23.7 wt %), EPDMN (10 wt %). The cathode had a good adhesion and cohesion. The sulfur coated loading was 3.4 mg/cm$^2$.

Electrochemical cells were then assembled and cycled similar to Example 2. Sulfur specific capacity at 5$^{th}$ cycle was 1070 mAh/g and was 947 mAh/g at 40$^{th}$ cycle.

As a control experiment, the same electrochemical cell was prepared as described above, except that instead of an XE2-water composite, a pure XE2 without filler was used to prepare the slurry and coat the cathode. The cathode coating had low sulfur loading and very poor adhesion and cohesion to the XE2 substrate, and, when assembled into an electrochemical cell, displayed poor sulfur specific capacity, similar to the control experiment described in Example 2.

Example 5

In the following example, the ability of the filler material to protect carbon porosity and surface area was studied.

Porous XE2 carbon was coated as described in Example 2 using either (1) a slurry containing EPMN in hexane (e.g., no filler material) or (2) a slurry containing ammonium bicarbonate filler material, and EPMN in hexane. The coated XE2 carbon was dried at room temperature and then heated to 70° C. to remove the solvent and filler material, producing a coated XE2 carbon having a carbon to binder ratio of 3:1 by weight.

BET surface area measurements were taken for the dry XE2 carbon samples. An XE2 carbon sample treated with hexane in the absence of binder had a surface area of 977 m$^2$/g, while an unprotected XE2 carbon sample treated with the binder solution shows a reduced surface area of 96 m$^2$/g. A XE2-$NH_4HCO_3$ composite material treated with the binder solution retained a surface area of 319 m$^2$/g.

These measurements indicated that the filler material served as a protective material for the pores of the XE2 carbon samples.

Example 6

Two electrochemical cells A and B were prepared using the methods described in Example 3. Cell A was cycled at a discharge current density of 0.5 mA/cm$^2$ and a charge current density of 0.5 mA/cm$^2$. For Cell B, a discharge current density of 0.5 mA/cm$^2$ and a charge current density of 0.5 mA/cm$^2$ were applied for the first 5 cycles. For the following three cycles for Cell B, a discharge current density of 1.0 mA/cm$^2$ and a charge current density of 0.5 mA/cm$^2$ were applied.

Figure 6:
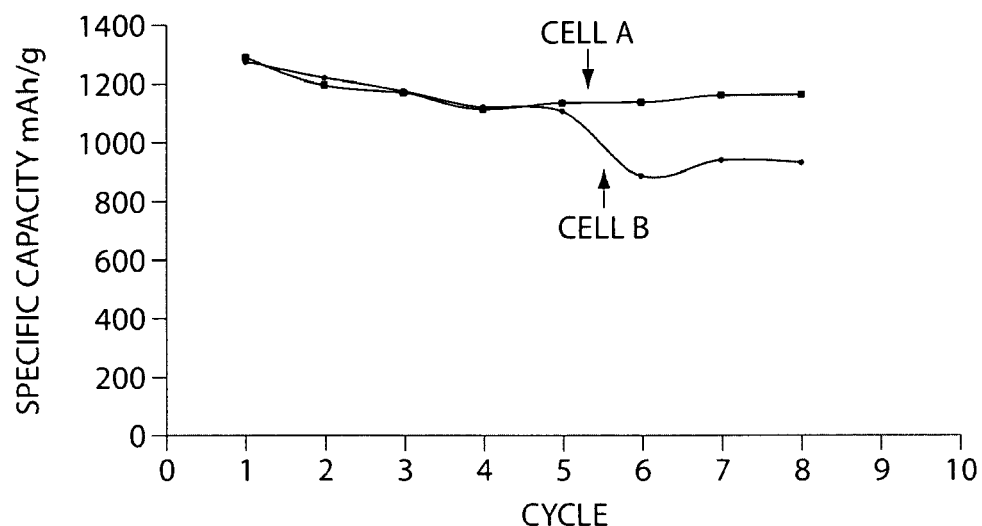
FIG. 6 shows a plot of the specific capacity as a function of cycle number for two electrochemical cells.

FIG. 6 shows the specific capacity as a function of cycle number for Cell A and Cell B. Cell A delivered a specific capacity of 1160-1260 mAh/g, or 69-75% of sulfur utilization for the first 8 cycles. Cell B delivered specific capacity of 940 mAh/g or 56% of sulfur utilization at discharge current density of 1.0 mA/cm².

Example 7

In the following example, several electrochemical cells were prepared using cathodes prepared with a liquid filler material present on a porous substrate and a soluble binder material, as described herein. These electrochemical cells were then compared to substantially similar cells prepared using cathodes with a porous substrate and a soluble binder material, but without a liquid filler material applied to the porous substrate. The specific capacities of these electrochemical cells were compared at several discharge currents. The liquid filler used in this example was octane and filler was applied to the porous substrate using a saturation method similar to a technique described above.

130 g of Vulcan carbon powder was placed in a metal sieve, the sieve mesh being small enough to support the carbon powder without loss of material through the sieve. This sieve was then placed in a glass dessicator, suspended above several grams of dessicant material. The vessel was then evacuated by use of a normal mechanical roughing pump; the vessel was purged of gas by this method for several minutes. The carbon powder was allowed to sit in the evacuated vessel overnight, for roughly 16 hours. The dessicator was then opened in a dry atmosphere and the sieve containing the carbon removed. The dessicant was replaced with 70 g of octane at room temperature and a magnetic stir bar was placed in the bottom of the vessel. The carbon in the sieve was replaced in the dessicator and the vessel was again evacuated using a mechanical roughing pump for several minutes. Once the vessel was evacuated it was placed on a magnetic stir/heat plate and the octane agitated at the slowest setting. The carbons were then left to absorb the octane from the atmosphere for two days. On the third day the heating element in the stir/heat plate was turned on and the temperature of the vessel was raised to 80° C. to increase the rate of octane absorption from the vapor. Once there was no liquid visible in the bottom of the dessicator the carbons were removed and promptly used to prepare the cathode slurry.

The octane filled carbons were mixed with a solution of 2156.3 g of solvent containing 47.5 wt % water, 34.4 g of PVOH, and 178.8 g of sulfur that had been milled for 25 minutes. Once the carbons were mixed with this solution they were milled together for an additional 5 minutes to make a 13.75% solid slurry. This slurry was coated onto a substrate using and atmospheric slot die coater and then dried using IR ovens near 100° C. for approximately 3 minutes. The resulting dry cathode contained 52 wt % Sulfur, 38 wt % Vulcan carbon and 10 wt % PVOH. The loading of the cathode was 1.85 mg/cm². Control cathodes were prepared as above except using Vulcan carbons as they were received from the material supplier. The slurry prepared for the control cathodes underwent all of the same milling, mixing, and coating procedures as described above.

Electrochemical cells were fabricated using both cathodes described above facing 3 mil Li foil, and employing 9 μm Tonen separator. Some electrochemical cells were prepared with a liquid filler and some were prepared without a liquid filler. Several experiments were conducted, where various electrochemical cells were prepared using electrolytes of varying compositions. Cells were each filled with 7.6 g of Electrolyte solution containing primarily 1,3 Dioxolane (DOL) and Dimethoxyethane (DME), with limited and various amounts of LiImide, $LiNO_3$, Guanidinium Nitrate, and Pyridine Nitrate in different specific experiments. Thirty electrochemical cells of similar composition were tested in six groups, as indicated in the Table below. Each group of 5 cells was cycled with a discharge current of either 500 mA, 2.2 A, or 4.4 A, from 2.5 V to 1.7 V, followed by a charge at 315 mA to 2.5 V.

TABLE 1

Electrochemical cells tested in Example 7.

| Group | Number of Cells Tested | Liquid Filler Used in Fabrication | Discharge Current (mA) |
|---|---|---|---|
| 1 | 5 | Yes | 500 |
| 2 | 5 | Yes | 2.2 |
| 3 | 5 | Yes | 4.4 |
| 4 | 5 | No | 500 |
| 5 | 5 | No | 2.2 |
| 6 | 5 | No | 4.4 |

Figure 7:
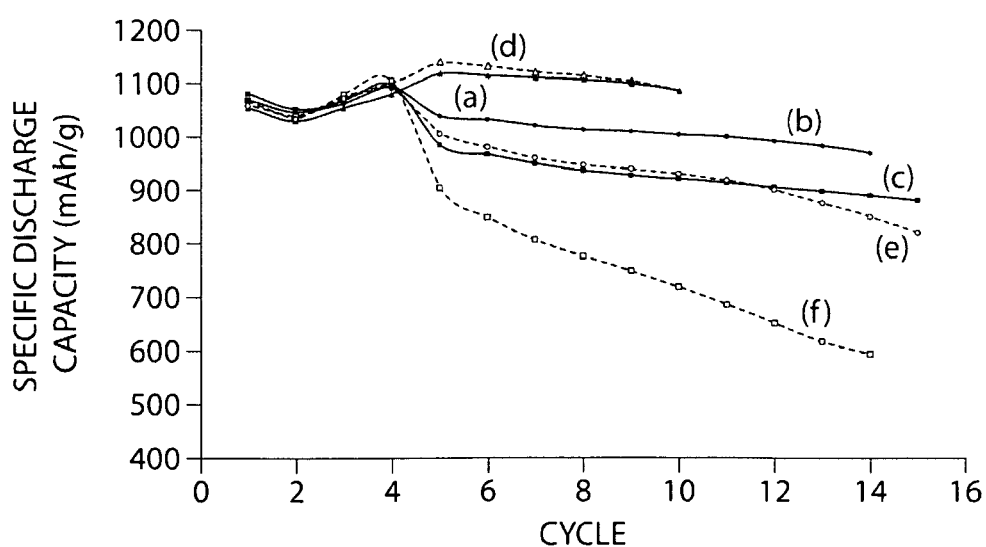
FIG. 7 shows a plot of specific capacity as a function of cycle number for an electrochemical cell, prepared using octane as liquid filler, at a discharge current of (a) 500 mA, (b) 2.2 A, and (c) 4.4 A, and an essentially identical electrochemical cell, prepared without octane as liquid filler, at a discharge current of (d) 500 mA, (e) 2.2 A, and (f) 4.4 A.

FIG. 7 shows a plot of the average specific capacity as a function of cycle number for the cells prepared using octane as liquid filler, at a discharge current of (a) 500 mA (Group 1), (b) 2.2 A (Group 2), and (c) 4.4 A (Group 3), and for the groups of cells prepared without octane as liquid filler, at a discharge current of (d) 500 mA (Group 4), (e) 2.2 A (Group 5), and (f) 4.4 A (Group 6). Cells fabricated with cathode prepared using a liquid filler system applied to the porous substrate had 1087, 1005, and 920 mAh/$g_{sulfur}$ specific capacity at the $10^{th}$ discharge with discharge currents of 500 mA, 2.2 A and 4.4 A respectively. Cells fabricated from a cathode prepared without a liquid filler system applied to the porous substrate had 1089, 929, and 717 mAh/$g_{sulfur}$ specific capacity at the $10^{th}$ discharge with discharge currents of 500 mA, 2.2 A and 4.4 A respectively. As shown in FIG. 7, cells prepared using octane as a liquid filler exhibited improved performance at elevated discharge currents relative to essentially identical cells prepared without a liquid filler.

What is claimed:

1. A method of forming an electrode, comprising:
   forming a filler material on a first portion of a porous material, wherein the porous material comprises carbon;
   after forming the filler material on the first portion of the porous material, forming an electrode material on at least a second portion of the porous material, wherein the electrode material comprises an active electrode species comprising sulfur and a binder material; and
   removing the filler material from the porous material, thereby forming the electrode.

2. A method as in claim 1, wherein the binder material and the active electrode species are applied to the porous material from a mixture comprising the binder material, the active electrode species, and a fluid carrier, wherein the binder material is at least partially soluble in the fluid carrier.

3. A method as in claim 1, wherein the filler material is a hydrophilic material and the binder material is soluble in a hydrophobic solvent.

4. A method as in claim 1, wherein the filler material is a hydrophobic material and the binder material is soluble in a hydrophilic solvent.

5. A method as in claim 1, wherein the binder material is provided in a solvent in which the binder material is substantially soluble.

6. A method as in claim 1, wherein the act of removing the filler material comprises heating the porous material.

7. A method as in claim 1, further comprising the act of treating at least a portion of the porous material prior to forming the filler material.

8. A method as in claim 7, wherein the act of treating comprises forming a polymeric material on at least a portion of the porous material.

9. A method as in claim 8, wherein the polymeric material is poly(ethylene glycol) coating.

10. A method as in claim 1, wherein the filler material is a solid.

11. A method as in claim 1, wherein the filler material is a liquid.

12. A method as in claim 1, wherein the filler material is octane, ammonium carbonate, or ammonium bicarbonate.

13. A method as in claim 1, wherein the binder material is a polymeric material.

14. A method as in claim 1, wherein the binder material is poly(ethylene-co-propylene-co-5-methylene-2-norbornene) (EPMN).

15. A method as in claim 1, wherein the electrode has a sulfur loading of at least 1.5 mg/cm$^2$.

16. A method as in claim 1, wherein the electrode has a sulfur loading of at least 2.5 mg/cm$^2$.

17. A method as in claim 1, wherein the electrode has a sulfur loading of at least 5.0 mg/cm$^2$.

18. The method of claim 1, wherein the porous material comprises a particulate porous material.

19. The method of claim 1, comprising applying a suspension comprising the porous material to a substrate.

20. The method of claim 19, wherein the suspension comprises a suspension liquid carrier.

21. The method of claim 20, comprising removing the suspension liquid carrier from the suspension after the suspension has been applied to the substrate.

22. The method of claim 19, wherein the filler material is removed from the porous material prior to applying the suspension comprising the porous material to the substrate.

23. A method of forming an electrode, comprising:
contacting a porous material comprising carbon with a filler solution comprising a filler material, such that the filler material forms a coating on a first portion of the porous material, producing a first coated porous material;
after contacting the porous material comprising the carbon with the filler solution to produce the first coated porous material, contacting the first coated porous material with an electrode material comprising an active electrode species comprising sulfur and a binder material, such that the electrode material forms a coating on at least a second portion of the porous material, producing a second coated porous material; and
removing at least some of the filler material from the second coated porous material, thereby forming the electrode.

24. A method as in claim 23, wherein the binder material and the active electrode species are applied to the porous material from a mixture comprising the binder material, the active electrode species, and a fluid carrier, wherein the binder material is at least partially soluble in the fluid carrier.

25. A method as in claim 23, wherein the filler material is a hydrophilic material and the binder material is soluble in a hydrophobic solvent.

26. A method as in claim 23, wherein the filler material is a hydrophobic material and the binder material is soluble in a hydrophilic solvent.

27. A method as in claim 23, wherein the binder material is provided in a solvent in which the binder material is substantially soluble.

28. A method as in claim 23, wherein the act of removing the filler material comprises heating the second coated porous material.

29. A method as in claim 23, further comprising the act of treating at least a portion of the porous material prior to contacting the porous material with the filler solution.

30. A method as in claim 29, wherein the act of treating comprises forming a polymeric material on at least a portion of the porous material.

31. A method as in claim 30, wherein the polymeric material is poly(ethylene glycol) coating.

32. A method as in claim 23, wherein the binder material is a polymeric material.

33. A method as in claim 32, wherein the binder material is poly(ethylene-co-propylene-co-5-methylene-2-norbornene) (EPMN).

34. A method as in claim 23, wherein the electrode has a sulfur loading of at least 1.5 mg/cm$^2$.

35. A method as in claim 23, wherein the electrode has a sulfur loading of at least 2.5 mg/cm$^2$.

36. A method as in claim 23, wherein the electrode has a sulfur loading of at least 5.0 mg/cm$^2$.

37. The method of claim 23, wherein the porous material comprises a particulate porous material.

38. The method of claim 23, comprising applying a suspension comprising the second coated porous material to a substrate.

39. The method of claim 38, wherein the suspension comprises a suspension liquid carrier.

40. The method of claim 39, comprising removing the suspension liquid carrier from the suspension after the suspension has been applied to the substrate.

41. The method of claim 38, wherein at least some of the filler material is removed from the second coated porous material prior to applying the suspension comprising the second coated porous material to the substrate.

* * * * *